United States Patent [19]
Murphy et al.

[11] Patent Number: 6,130,980
[45] Date of Patent: Oct. 10, 2000

[54] RIBBON ASSEMBLIES AND INK COATING COMPOSITIONS FOR USE IN FORMING THE RIBBON ASSEMBLIES

[75] Inventors: Edward J. Murphy, Arlington Heights; Edward P. Zahora, Naperville; David M. Szum, Elmhurst, all of Ill.

[73] Assignee: DSM N.V., Heerlen, Netherlands

[21] Appl. No.: 09/072,181

[22] Filed: May 5, 1998

Related U.S. Application Data

[60] Provisional application No. 60/045,746, May 6, 1997.

[51] Int. Cl.$^7$ ..................................................... G02B 6/04
[52] U.S. Cl. ............................ 385/115; 522/182; 522/75; 522/81; 522/121; 522/64; 385/114; 385/129; 428/373; 428/344; 428/378; 428/3
[58] Field of Search .................................. 522/64, 75, 81, 522/18, 121, 182, 12; 385/114, 115, 129; 428/373, 344, 378

[56] References Cited

U.S. PATENT DOCUMENTS

| | | | |
|---|---|---|---|
| 4,496,210 | 1/1985 | Ansel . | |
| 4,560,616 | 12/1985 | Okita . | |
| 4,624,994 | 11/1986 | Ansel . | |
| 4,629,285 | 12/1986 | Carter et al. ............................ | 385/128 |
| 4,660,927 | 4/1987 | Kondow . | |
| 4,682,851 | 7/1987 | Ansel . | |
| 4,732,997 | 3/1988 | Tschopp . | |
| 4,782,129 | 11/1988 | Moschovis . | |
| 4,794,133 | 12/1988 | Moschovis . | |
| 4,806,574 | 2/1989 | Krajewski . | |
| 4,844,604 | 7/1989 | Bishop . | |
| 4,849,462 | 7/1989 | Bishop . | |
| 4,900,126 | 2/1990 | Jackson et al. ........................ | 385/114 |
| 4,906,067 | 3/1990 | Mayr . | |
| 4,953,945 | 9/1990 | Nishimura . | |
| 4,980,007 | 12/1990 | Ferguson ................................. | 156/179 |
| 5,011,260 | 4/1991 | Marx et al. ............................ | 385/100 |
| 5,219,896 | 6/1993 | Coady . | |
| 5,259,060 | 11/1993 | Edward et al. ........................ | 385/128 |
| 5,334,421 | 8/1994 | McNutt ................................... | 427/513 |
| 5,336,563 | 8/1994 | Coady . | |
| 5,368,985 | 11/1994 | Rutsch . | |
| 5,373,578 | 12/1994 | Parker . | |
| 5,399,770 | 3/1995 | Leppard . | |
| 5,399,782 | 3/1995 | Leppard . | |
| 5,446,821 | 8/1995 | Nonaka et al. ........................ | 385/128 |
| 5,472,992 | 12/1995 | Leppard et al. ....................... | 522/18 |
| 5,485,539 | 1/1996 | Mills ...................................... | 385/114 |
| 5,524,164 | 6/1996 | Hattori . | |
| 5,539,849 | 7/1996 | Petisce . | |
| 5,561,730 | 10/1996 | Lochkovic et al. .................... | 385/114 |
| 5,598,498 | 1/1997 | Comezzi ................................. | 385/114 |
| 5,621,838 | 4/1997 | Nomura et al. ........................ | 385/100 |
| 5,717,805 | 2/1998 | Stulpin .................................. | 385/114 |
| 5,723,512 | 3/1998 | Leppard et al. ....................... | 522/55 |
| 5,761,363 | 6/1998 | Mills ...................................... | 385/114 |
| 5,767,169 | 6/1998 | Leppard et al. ....................... | 522/64 |
| 5,837,750 | 11/1998 | Szum et al. ............................ | 522/81 |
| 5,881,194 | 3/1999 | Clarke ................................... | 385/115 |

FOREIGN PATENT DOCUMENTS

| | | |
|---|---|---|
| 0194 891 A1 | 9/1986 | European Pat. Off. . |
| 0 262 340 A2 | 4/1988 | European Pat. Off. . |
| 0 345 968 A2 | 12/1989 | European Pat. Off. . |
| 0 407 004 A2 | 1/1991 | European Pat. Off. . |
| 0 495 751 A1 | 7/1992 | European Pat. Off. . |
| 0 495 752 A1 | 7/1992 | European Pat. Off. . |
| 0 527 266 A1 | 2/1993 | European Pat. Off. . |
| 0 560 724 A1 | 9/1993 | European Pat. Off. . |
| 0 614 099 A2 | 9/1994 | European Pat. Off. . |
| 0 615 980 A1 | 9/1994 | European Pat. Off. . |
| 0 699 933 A2 | 6/1996 | European Pat. Off. . |
| 0 753 777 A2 | 1/1997 | European Pat. Off. . |
| 0 780 712 A2 | 6/1997 | European Pat. Off. . |
| 2 672 699 A1 | 8/1992 | France . |
| 4007 519 | 3/1990 | Germany . |
| 62-177159 | 1/1989 | Japan . |
| 62-311609 | 6/1989 | Japan . |
| 4057 814 | 6/1990 | Japan . |
| H3-35210 | 2/1991 | Japan . |
| 3067 208 | 6/1991 | Japan . |

(List continued on next page.)

OTHER PUBLICATIONS

Valet et al., Photoinitiators for Novel UV Curing Applications Coloured and Weatherfast Coatings., 4th Nurnberg Congress, Paper 33, pp 2–9.

K.W. Jackson, et al., "The Effect of Fiber Ribbon Component Materials on Mechanical and Environmental Performance", 28 International Wire & Symposium Proceedings (1993).

H.C. Chandon, et al., "Fiber Protective Design for Evolving Telecommunication Applications", International Wire & Symposium Proceedings (1992).

J.R. Toler, et al., "Factors Affecting Mechanical Stripping of Polymer Coatings From Optical Fibers", International Wire & Cable Symposium Proceedings (1989).

W. Griffioen, "Strippability of Optical Fibers", EFOC & N, Eleventh Annual Conference, Hague (1993).

*Primary Examiner*—James J. Seidleck
*Assistant Examiner*—Sanza McClendon
*Attorney, Agent, or Firm*—Jeffrey S. Melcher

[57] ABSTRACT

Provided is a ribbon assembly having the functional capability of providing break-out of ink coated optical glass fibers from said ribbon assembly. The monomers, oligomers and photoinitiator for forming an ink coating on the optical glass fibers contained in the ribbon assembly have been selected to provide an average percentage of reacted acrylate unsaturation which provides a level of adhesion between a matrix material and an ink coating that is less than a level of adhesion between the ink coating and the coated optical glass fiber to provide break-out of the ink coated optical glass fiber from said ribbon assembly. Also provided are ink coating compositions adapted to form ink coatings suitable for use on optical glass fibers contained in the ribbon assembly.

23 Claims, No Drawings

FOREIGN PATENT DOCUMENTS

| | | |
|---|---|---|
| 2 259 704 A1 | 3/1993 | United Kingdom . |
| 90/13579 | 11/1990 | WIPO . |
| WO 90/13579 A1 | 11/1990 | WIPO . |
| WO 97/05515 A1 | 2/1997 | WIPO . |
| WO 97/16469 A1 | 5/1997 | WIPO . |
| WO 97/18493 A1 | 5/1997 | WIPO . |
| WO 97/19029 A1 | 5/1997 | WIPO . |

RIBBON ASSEMBLIES AND INK COATING COMPOSITIONS FOR USE IN FORMING THE RIBBON ASSEMBLIES

This application claims priority to provisional patent application Ser. No. 60/045,746 filed on May 6, 1997.

BACKGROUND OF THE INVENTION

1. Field of the Invention

The invention relates to ribbon assemblies which provide the functional capability of break-out of the individual coated optical glass fibers. Also provided are radiation-curable ink compositions that are suitable for use in forming the ribbon assemblies.

2. Description of Related Art

Optical glass fibers are generally coated with two superposed radiation-cured coatings, which together form a primary coating. The coating which is in direct contact with the glass is called the inner primary coating and the overlaying coating(s) is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating(s), which is on the exposed surface of the coated fiber, is typically a relatively harder coating designed to provide a desired resistance to physical handling forces, such as those encountered when the fiber is cabled.

For the purpose of multi-channel transmission, ribbon assemblies containing a plurality of coated optical fibers have been used. A typical ribbon assembly comprises a plurality of coated optical glass fibers which are bonded together in a matrix material. For example, the matrix material can encase the optical glass fibers, or the matrix material can edge-bond the optical glass fibers together. Ribbon assemblies provide a modular design which simplifies the construction, installation and maintenance of optical glass fibers by eliminating the need to handle individual optical glass fibers.

Coated optical glass fibers for use in ribbon assemblies are usually coated with an outer colored layer, called an ink coating, or alternatively a colorant is added to the outer primary coating to facilitate identification of the individual coated optical glass fibers. Thus, the matrix material which binds the coated optical glass fibers together contacts the outer ink layer if present, or the colored outer primary coating.

Ink coatings usually have a thickness of about 3 to about 10 microns and are formed from a pigment dispersed within a UV curable carrier system. The UV curable carrier system contains a UV curable oligomer or monomer that is liquid before curing to facilitate application of the ink composition to the optical glass fiber, and then a solid after being exposed to UV radiation. In this manner, the UV curable ink composition can be applied to a coated optical glass fiber in the same manner as the inner primary and outer primary coatings are applied.

As the demand for coated optical glass fibers has increased, manufacturers must respond by adding more fiber drawing production lines and by attempting to increase the linear line speeds of the existing fiber drawing production lines. In the latter case, one factor which will determine the upper limit for the line speed will be the curing rate characteristics of the radiation-curable ink composition, for a given radiation source and intensity.

If the line speed is increased to the extent that cure rate time requirements of the radiation-curable ink composition are not provided, the radiation-curable ink composition will not have received a sufficient amount of radiation to cause complete cure, or cross-linking, of the radiation-curable ink composition. The production linear line speed is generally inversely related to the amount of radiation striking the optical glass fiber. That is, as the production line speed is increased the amount of radiation exposure to the radiation-curable ink composition during the production process will necessarily decrease for a given radiation source. Incomplete cure of the radiation-curable ink composition is undesirable and must be avoided because then the desired properties of the incompletely cured ink coating may not be achieved and/or the incompletely cured ink coating may retain tackiness (giving problems in subsequent handling) or a malodorous odor may be present, and there may also be an increase in the extractables (undesirable) in the supposedly-cured ink coating.

In general, radiation-curable ink coating compositions can cure at a significantly slower rate than radiation-curable outer primary coating compositions. It is believed that the pigments present in ink compositions contribute to the slower cure speed of ink coatings. Thus, there is a need for improving the cure speed of the ink coating.

While the ink composition must have a very fast cure speed to ensure complete cure of the ink coating on the high speed drawing tower, the increase in cure speed should not come at the expense of other important properties of the ink coating, such as providing suitable break-out performance. Break-out performance is the ability of the ink coating to separate from the matrix material without separating the ink layer from the outer primary coating to provide mid-span access or end-access to the individual coated optical glass fibers contained within the ribbon-assembly. Mid-span access is access to the individual coated optical glass fibers at a portion of the ribbon assembly between the ends of the ribbon assembly and end-access is access to the individual coated optical glass fibers at a terminus of the ribbon assembly. Therefore, there is a need for a radiation-curable ink composition that exhibits adaptable adhesion properties to provide an adhesion between the outer primary coating and the ink coating that is greater than the adhesion between the ink coating and the matrix material to provide suitable break-out performance.

In addition, ink compositions should not contain ingredients that can migrate to the surface of the optical glass fiber and cause corrosion. The ink composition should also not contain ingredients which can cause instability in the protective coatings or matrix material. Ink coatings for optical glass fibers should be color fast for decades, not cause attenuation of the signal transmission, be impervious to cabling gels and chemicals, and allow sufficient light penetration for fiber core alignment.

From the above, it is clear that optical glass fiber technology places many unique demands on radiation-curable ink compositions which more conventional technologies, such as printing inks, do not.

U.S. Pat. No. 4,900,126 discloses a ribbon assembly in which the bond interface between the matrix material and the colorant material is weaker than the bond interface between the colorant material and the outermost coating on the optical glass fiber. To provide this property, the matrix material cannot be identical to the secondary coating on the optical glass fiber. Furthermore, a release agent must be added to the outer surface of the coated optical glass fibers prior to application of the matrix material. This method of providing break-out performance is undesirable because of the extra step of applying the release agent must conducted and the release agent may undesirably cause delamination of the matrix material from the coated optical glass fibers.

Published Japanese Patent Application No. H1-152405 discloses a radiation-curable ink composition containing an organic polysiloxane compound. The polysiloxane compound provides the ink coating with the ability to separate more easily from the matrix material in a ribbon assembly.

Published Japanese Patent Application No. 64-22976 discloses radiation-curable ink compositions containing specific radiation-curable oligomers. The ink composition provides an ink coating having adhesion to the outer primary coating which is separable from the matrix material in a ribbon assembly.

There is a need for a ribbon assembly which is capable of providing break-out of the individual coated optical glass fibers, without requiring the use of a release agent.

Usually ink compositions must be cured in an inert atmosphere, i.e. under nitrogen or other inert gasses. Providing inert atmospheres on optical glass fiber drawing towers is expensive. Thus, a radiation-curable ink composition which exhibits a high cure speed in the presence of air would provide significant advantages over ink-compositions that must be cured in an inert atmosphere.

SUMMARY OF THE INVENTION

An objective of the present invention is to provide ribbon assemblies having suitable break-out performance, without requiring the use of a release agent.

Another objective of the present invention is to provide radiation-curable ink compositions which are adapted to provide cured ink coatings having greater adhesion to the outer primary coating than to a matrix material, to provide the ribbon assembly with the capability of break-out of the individual coated optical glass fibers.

A further objective of the present invention is to provide radiation-curable ink compositions that exhibit enhanced cure speed in the presence of air.

The above objectives and other objectives can be obtained by the novel ribbon assemblies according to the present invention. Provided is a novel ribbon assembly having the functional capability of providing break-out of ink coated optical glass fibers from the ribbon assembly. The ribbon assembly comprises a plurality of coated optical glass fibers; an ink coating on at least one of the coated optical glass fibers; and a matrix material binding the plurality of coated optical fibers together. The ink coating is formed from a radiation curable ink coating composition comprising a radiation-curable carrier system containing a radiation-curable oligomer, a radiation curable monomer, and at least one photoinitiator; and a pigment dispersed in the radiation-curable carrier system. The monomers, oligomers and photoinitiator have been selected to provide an average percentage of reacted acrylate unsaturation which provides a level of adhesion between the matrix material and the ink coating that is less than a level of adhesion between the ink coating and the coated optical glass fiber to provide breakout of the ink coated optical glass fiber from the ribbon assembly when the ink coating composition is cured by exposure to an ultraviolet radiation dose of about 0.125 joules per square centimeter.

Also provided is a novel ribbon assembly having the functional capability of providing break-out of the individual coated optical glass fibers. The ribbon assembly comprises a plurality of coated optical glass fibers; and a matrix material which binds the plurality of coated optical glass fibers together. At least one of the coated optical glass fibers comprises an optical glass fiber; an inner primary coating adjacent to a surface of the optical glass fiber; an outer primary coating adjacent to a surface of an inner primary coating; and an ink coating adjacent to a surface of the outer primary coating. The ink coating is formed from a radiation-curable ink coating composition containing a monomer selected to be adsorbable into the outer primary coating to a degree which when suitably cured provides a level of adhesion between the ink coating and the outer primary coating that is greater than a level of adhesion between the ink coating and the matrix material.

Also provided are novel radiation-curable ink coaling compositions which are capable of providing ink coatings suitable for use in ribbon assemblies when the property of break-out is desired.

DETAILED DESCRIPTION OF THE INVENTION

Provided are novel ribbon assemblies containing a plurality of coated optical glass fibers which are bound together by a matrix material. The coated optical glass fibers each have an ink coating for identifying the individual fibers. The level of adhesion between the ink coating and the matrix material has been adjusted to be less than the level of adhesion between the ink coating and the secondary coating on the optical glass fiber, which provides the functional capability of providing break-out of the individual coated optical glass fibers. The level of adhesion between the ink coating and the secondary coating and the level of adhesion between the ink coating and the matrix material can be adjusted to suitable levels according to the present invention by the following:

(1) decreasing the adhesion between the ink coating and the matrix material of the ribbon assembly by utilizing monomers, oligomers and a photoinitiator in the ink coating composition that provide an increase in the percent reacted acrylate unsaturation ("% RAU"), when exposed to about 0.125 J/cm² UV radiation; and/or (2) increasing the adhesion between the ink coating and the outer primary coating of the ribbon assembly by including a monomer in the ink coating composition which is adsorbable into the outer primary coating to a greater degree.

The ink coating compositions of this invention can be based on any known ink composition for coating and identifying coated optical glass fibers. In general, the radiation-curable ink compositions contain at least one pigment dispersed within a radiation-curable carrier system. The radiation-curable carrier system contains monomers, oligomers and a photoinitiator.

The conventional ink compositions can become the improved ink composition according to the present invention by selecting monomers, oligomers and a photoinitiator which provide a % RAU", when exposed to about 0.125 J/cm² UV radiation, such that the level of adhesion between the ink coating and the matrix material is less than the level of adhesion between the ink coating and the outer primary coating. Preferably, the average % RAU is at least 70%, more preferably at least about 75%, and most preferably at least about 80%, when cured in the presence of air. Preferably, the average % RAU is at least 75%, more preferably at least about 80%, and most preferably at least about 85%, when cured in an inert atmosphere. The average % RAU should be based on the % RAU of at least four different color ink coating compositions, each having the same radiation-curable carrier system. Preferably, the average % RAU is based on at least 6, more preferably at least 12, different color ink coating compositions.

Without being bound by any theory, it is believed that the fewer the amount of unreacted acrylate present on the ink coating, the fewer the number of sites for cross-linking between the matrix material and the ink coating. The fewer the number of cross-linking sites, the lower the level of adhesion between the ink coating and the matrix material. As the % RAU increases, the amount of unreacted acrylate decreases. Thus, the higher % RAU the lower the adhesion between the ink coating and the matrix material.

The % RAU can adjusted to a suitable level by utilizing an ink cure speed enhancing photoinitiator. The ink cure speed enhancing photoinitiator preferably comprises a free-radical generating photoinitiator represented by the following formula (1):

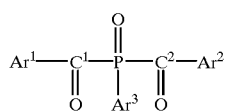

(1)

Where: Ar represents a carbon containing compound having at least one aromatic functional group, wherein "P" is bonded directly to an aromatic functional group present in $Ar^3$, $C^1$ is bonded directly to an aromatic functional group present in $Ar^1$, and $C^2$ is bonded directly to an aromatic functional group present in $Ar^2$. At least one of the carbon containing compounds "Ar" has a molecular weight and molecular structure that is suitable for forming at least one of the following free-radicals:

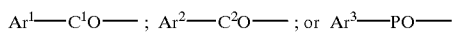

Preferably, all three carbon containing compounds "Ar" have a molecular weight and molecular structure that is suitable for forming the above free-radicals. For example, the carbon containing compounds can have from about 5 to about 15 carbon atoms. Suitable examples of the carbon containing compounds include a furane ring or a benzene ring.

One or more of the hydrogens present on the aromatic ring can be substituted, for example, with alkyl and/or alkoxy groups. Examples of suitable alkyl substituents include methylene, ethylene, butylene and propylene groups. Examples of suitable alkoxy substituents include methoxylate, ethoxylate, butoxylate and propoxylate groups.

A preferred cure speed enhancing photoinitiator includes one represented by the following formula (2):

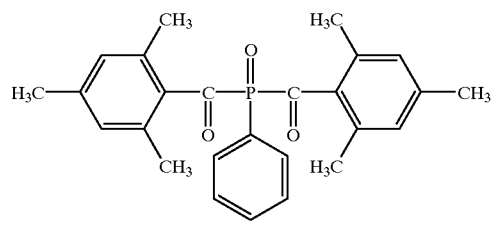

(2)

The radiation-curable ink composition can also contain other free-radical generating photoinitiators in combination with the ink cure speed enhancing photoinitiator. Examples of suitable free radical-type photoinitiators include, but are not limited to, the following:
isobutyl benzoin ether;
2,4,6 trimethylbenzoyl diphenylphosphine-oxide;
1-hydroxycyclohexylphenyl ketone;
2-benzyl-2-dimethylamino-1-(4-morpholinophenyl)-butan-1-one;
2,2-dimethoxy-2-phenylacetophenone;
perfluorinated diphenyl titanocene;
2-methyl-1-[4-(methylthio)phenyl]-2-(4-morpholinyl)-1-propanone;
2-hydroxy-2-methyl-1-phenyl propan-1-one;
4-(2-hydroxyethoxy)phenyl-2-hydroxy-2-propyl ketone dimethoxyphenylacetophenone;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;
benzophenone;
1-propanone, 2-methyl-1-1-(4-(methylthio)phenyl) 2-(4-morpholinyl); and mixtures of these.

Preferably, the radiation-curable ink composition contains a mixture of benzophenone and 2-methyl-1-[4-(methylthio) phenyl]-2-(4-morpholinyl)- 1-propanone.

Preferably, the ink cure speed enhancing photoinitiator is present in an amount which provides the desired % RAU. In general, the greater the amount of ink cure speed enhancing photoinitiator, the higher the % RAU. Suitable amounts of the ink cure speed enhancing photoinitiator are from about 1 to about 25 weight %, preferably from about 1.5 to about 20 weight %, and most preferably from about 4 to about 15 weight %, based on the total weight of the ink composition. In general, if other photoinitiators are present in the ink composition in combination with the ink cure speed enhancing photoinitiator, the ink cure speed enhancing photoinitiator can be used in lesser amounts to provide the desired cure speed.

As the amount of radiation that a radiation-curable ink composition is exposed to is increased, the amount of a specific physical or performance property of the cured ink coating (measured as a percentage of the fully attainable value for the specific ink composition) correspondingly increases. This increase continues until the maximum attainable value of the measured physical or performance property is achieved. The maximum attainable value of a physical or performance property cannot be exceeded by further exposure to radiation. Examples of physical or performance properties are cross-link density as measured using MEK, modulus, glass transition temperature, hardness, surface adhesion, and remaining extractables. Cross-link density as measured using MEK is used herein by way of example.

Once the measured cross-link density reaches the maximum attainable value, further exposure to radiation does not result in an increase in the cross-link density. For purposes of comparing cure speeds among different radiation-curable ink compositions, the term "cure speed" can be represented by the radiation dose which provides a cross-link density such that the MEK value is a predetermined set number rubs at a thickness of 20 microns. The lower the radiation dose required to attain an MEK value of the predetermined set number rubs, the faster the cure speed. If desired, other physical properties can be used to compare the cure speeds of different radiation-curable compositions, however, the MEK value is preferred.

The cure speed enhancing photoinitiator can be present in an amount which provides the radiation-curable ink composition containing at least one pigment that absorbs light in a visible wavelength with a cure speed such that a MEK value of at least 25 rubs is achieved using an irradiation of about 0.125 J/cm$^2$ at a thickness of 20 microns in air. Preferably, the cure speed enhancing photoinitiator is present in an amount which provides the radiation-curable ink composition containing at least one pigment that absorbs light in a visible wavelength with a cure speed such that a MEK value of at least about 100 rubs, more preferably at least about 200 rubs, is achieved using an irradiation of about 0.125 J/cm$^2$ at a thickness of 20 microns in air.

Commercial examples of suitable ink compositions that can be reformulated to contain an ink cure speed enhancing photoinitiator according to the present invention include the radiation-curable inks available from DSM Desotech Inc., which are based on multi-functional acrylate monomers.

Ink coatings are usually about 3 to about 10 microns thick, and should be concentric to prevent attenuation of the signal transmission. The ink coating also generally has a Tg of at least about 30° C., more preferably at least about 50° C. One of ordinary skill in the art of formulating radiation-curable ink compositions knows how to adjust the radiation-curable composition to provide the desired properties of the cured coating. Thus, radiation-curable compositions which are usually used for forming outer primary coating compositions can be reformulated and utilized as the radiation-curable carrier system in the ink composition according to the present invention. Examples of suitable radiation-curable compositions which may be reformulated variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Radiation-curable carrier systems which are suitable for forming the present ink composition contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, -vinyl amide, maleate esters, and fumarate esters. Preferably, the ethylenic unsaturation is provided by a group containing acrylate, methacrylate, or styrene functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, at least about 80 mole %, more preferably, at least about 90 mole %, and most preferably substantially all of the radiation-curable functional groups present in the oligomer are acrylate or methacrylate.

A mixture of mono-, di-, tri-, tetra-, and higher functionalized oligomers can be used to achieve the desired balance of properties, wherein the funcationalization refers to the number of radiation-curable functional groups present in the oligomer.

The oligomers usually comprise a carbon-containing backbone structure to which the radiation-curable functional group(s) are bound. Examples of suitable carbon-containing backbones include polyethers, polyolefins, polyesters, polyamides, and polycarbonates. The size of the carbon-containing backbone can be selected to provide the desired molecular weight. The number average molecular weight of the oligomer is usually between about 500 to about 10,000, preferably between about 500 to about 7,000, and most preferably between about 1,000 to about 5,000.

For example, the carbon-containing backbone of the oligomer can comprise aromatic groups and ring-opened epoxy groups or alkoxy groups. The oligomer can be represented by, for example:

R-Ar-R;

or

R-L-Ar-L-R where r is a radiation-curable functional group,

Ar is an aromatic group containing moiety, and

L is a linking group.

Examples of suitable linking groups include alkoxy or ring opened epoxy such as ethoxy, propoxy, butoxy, and repeat units thereof. L can also be a urethane or urea linking group.

The aromatic groups can be, for example, derived from bisphenol units, such as bisphenol A. A preferred oligomer is a diglycidyl ether derivative of bisphenol A to which acrylate functional groups have been bound. A commercially available example of such an oligomer is CN-120 (Sartomer), which has a molecular weight of about 1300, and when cured has a Tg of about 65° C.

Another example of a preferred oligomer is a trifunctional polyether or polyester having a molecular weight of about 500 to about 5000. A preferred example of a trifunctional oligomer is the commercially available polyurethane triacrylate Ebecryl 264, which has a molecular weight of about 2000 and when cured a Tg of about 42° C.

The oligomer can be present in an amount of from about 1 to about 80 wt. %, preferably from about 10 to about 70 wt. %, and more preferably from about 20 to about 60 wt. %, based on the total weight of the ink coating composition.

The radiation-curable carrier systems may also contain a reactive diluent which is used to adjust the viscosity. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate, 2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Another type of reactive diluent that can be used is a compound having an aromatic group. Particular examples of reactive diluents having an aromatic group include: ethyleneglycolphenylether-acrylate, polyethyleneglycolphenyletheracrylate, polypropyleneglycolphenyletheracrylate, and alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:

$C_2$–$C_{18}$ hydrocarbon-dioldiacrylates, $C_4$–$C_{18}$ hydrocarbondivinylethers, $C_3$–$C_{18}$ hydrocarbon triacrylates, and the polyether analogues thereof, and the like,
such as
1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:

epoxy-cyclohexane,
phenylepoxyethane,
1,2-epoxy-4-vinylcyclohexane,
glycidylacrylate,
1,2-epoxy-4-epoxyethyl-cyclohexane,
diglycidylether of polyethylene-glycol,
diglycidylether of bisphenol-A,
and the like.

If the radiation-curable functional group of the radiation-curable monomer or oligomer has an amine-ene or thiol-ene system, examples of reactive diluents having allylic unsaturation that can be used include:

diallylphthalate,
triallyltri-mellitate,
triallylcyanurate,
triallylisocyanurate, and
diallylisophthalate.

For amine-ene systems, amine functional diluents that can be used include, for example:

the adduct of trimethylolpropane, isophorondiisocyanate and di(m)ethylethanolamine, the adduct of hexanediol, isophoronediisocyanate and dipropylethanolamine, and the adduct of trimethylol propane, tri-methylhexamethylenediisocyanate and di(m)ethylethanolamine.

Other additives which can be used in the radiation-curable carrier system include, but are not limited to, conventional photoinitiators, catalysts, lubricants, wetting agents, antioxidants and stabilizers. The selection and use of such additives is within the skill of the art.

The ribbon assemblies according to the present invention are capable of providing break-out without requiring the use of a release agent. Therefore, the ribbon assembly, in particular the ink coating compositions utilized to form the ink coatings contained in the ribbon assembly, are preferably substantially free-of a release agent. However, if desired a release agent can be added to the ink coating. Suitable release agents include silicones, silicone acrylates, fluorocarbon oils or resins and the like. The release agent can be present in an amount of about 0.1 to about 20 wt. %, more preferably about 0.1 to about 10 wt. %, based on the total weight of the ink composition.

Any inorganic and organic pigment that is suitable for making radiation-curable ink compositions can be used in the present invention. However, since white pigments usually do not absorb significant amounts of the radiation used to cure the ink composition, white ink compositions may not require the use of the ink cure speed enhancing photoinitiator according to the present invention to provide a sufficiently fast cure speed. Therefore, the preferred pigments are pigments that absorb light cf a visible wave length, i.e. any color except pure white. The use of the term "pigment" refers to both inorganic and organic pigments.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Examples of twelve colors normally used for making ribbon assemblies include: black, white, yellow, blue, red, green, orange, brown, pink, aqua, violet, and gray.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), napthole red, monoazo based pigments, quinacridone pigments, anthraquinone, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments.

Suitable aqua, brown, gray, and pink pigments can easily be formulated by combining other colors. One skilled in the art is able to form any color as desired by combining different.

The pigment can be present in the ink composition in an amount that provides coloration that is visible without magnification to facilitate identification of the individual colored optical glass fiber. The amount of the pigment should not be so great as to significantly reduce the cure speed of the ink composition or result in other undesirable affects. Examples of suitable amounts of pigment have been found to be from about 1 to about 20 weight %, preferably about 1 to about 15 weight %, more preferably about 1 to about 10 weight %, based on the total weight of the ink composition.

Based on the above, a suitable radiation-curable ink composition can be formulated from a composition containing:

from about 1 to about 20 weight % of at least one pigment that absorbs light of a visible wavelength;

from about 1 to about 25 weight % of an ink cure speed enhancing photoinitiator; and from about 55 to about 98% of a radiation-curable carrier system containing at least radiation-curable monomeroroligomer, based on the total weight of the ink composition.

A preferred ink composition can be formulated from a composition containing:

from about 1 to about 20 weight % of at least one pigment which absorbs light of a visible wavelength;

from about 1 to about 80 weight % of at least one radiation-curable oligomer;

from about 1 to about 80 weight % of at least one radiation-curable diluent monomer; and from about 1 to about 20 weight % of at least one ink cure speed photoinitiator, based on the total weight % of the ink composition.

Preferred amounts of the ink cure speed enhancing photoinitiator are from about 1.5 to about 20 weight %, more preferably from about 4 to about 15 weight%.

Preferred amounts of the radiation-curable oligorner include from about 10 to about 70% by weight, more preferably, about 20 to about 60% by weight, based on the total weight of the ink composition.

Preferred amounts of the radiation-curable diluent monomer include from about 10 to about 70% by weight, more preferably, about 20 to about 60% by weight, based on the total weight of the ink composition.

Preferably, the ink composition contains other photoinitiators in an amount of about 1 to about 20% by weight, more preferably about 1 to about 10% by weight, based on the total weight of the ink composition.

The present invention also provides an ink composition having enhanced adhesion to the outer primary coating when suitably cured. It has been found that surprisingly the adhesion of the ink coating to the outer primary coating can be approximated by how well a monomer present in the ink composition adsorbs in the outer primary coating. In general, the greater the adsorption of the monomer into the outer primary coating, the greater the adhesion of the cured ink coating to the outer primary coating.

If the ink coating separates from the outer primary coating during mid-span access to the individual optical glass fibers, the identification of the individual optical glass fibers can be difficult or even unattainable. Using the present invention, the adhesion of the ink coating to the outer primary coating can be easily adjusted to provide an ink coating having greater adhesion to the outer primary coating than to the matrix material to provide a ribbon assembly that is capable of providing mid-span access to the individual optical glass fibers while avoiding undesirable delamination of the ink coating from the outer primary coating during mid-span access.

Preferably, the monomer present in the ink composition exhibits an Outer Primary Adsorption Index of at least about 5, preferably at least about 7, and most preferably at least about 10.

The adsorption index of the monomer can be determined without undue experimentation by first preparing 75 micron thick drawdown of the outer primary coating to be coated by the ink composition. The drawdown is then suitably cured by exposure to radiation and then cut into 2 inch by 2 inch sample squares. The sample square is then submerged in the monomer present in the desired ink coating for 30 seconds under atmospheric pressure and room temperature (25° C.). The amount of weight gain in the sample expressed as a percentage of the original weight of the sample is used to determine the outer primary adsorption index as follows.

Outer Primary Adsorption Index:

| 1 | = | .1% weight gain |
| 2 | = | .2% weight gain |
| 3 | = | .3% weight gain |
| 4 | = | .4% weight gain |
| 5 | = | .5% weight gain |
| 6 | = | .6% weight gain |
| 7 | = | .7% weight gain |
| 8 | = | .8% weight gain |
| 9 | = | .9% weight gain |
| 10 | = | 1% weight gain |

Thus, for an adsorption index of 5, the sample gained about 0.5% in weight after being submerged in the monomer for 30 seconds.

The amount of the monomer can be selected to provide the desired level of adhesion between the outer primary coating and the ink coating. In general, the greater the amount of a monomer having an adsorption index of at least about 5, the greater the adhesion between the outer primary coating and the ink coating. Suitable examples of such a monomer are from about 1 to about 20 wt. %, and preferably from about 1 to about 10 wt. %, based on the total weight of the ink composition.

The above embodiments can be used in combination to provide an improved radiation-curable ink composition which exhibits the combination of properties of:

(i) when suitably cured provides the ribbon assembly with the functional capability of providing break-out without delaminating the ink coating from the outer primary coating;

(iii) when suitably cured provides sufficient adhesion between the matrix material and the ink coating to resist delamination; and (iii) exhibits an enhanced cure-speed in air such that the ink coating can be formed at high speed without the need for providing an inert atmosphere.

The ink coating composition can be applied to the coated optical glass and cured using any suitable method. An example of a suitable method is disclosed in U.S. Pat. No. 4,629,285, the complete disclosure of which is incorporated herein by reference. The ink composition can also be applied in a manner similar to the application of the outer primary coating on an optical glass fiber drawing and coating tower.

The novel ribbon assembly made according to this invention can be used in telecommunication systems. Such telecommunication systems typically include ribbon assemblies containing optical glass fibers, transmitters, receivers, and switches. The ribbon assembly containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assembly containing the coated optical glass fibers are the fundamental connecting units of such cable television systems. The ribbon assembly can be buried under ground or water for long distance connections, such as between cities. The ribbon assembly can also be used to connect directly to residential homes.

The ink compositions according to the present invention are surprisingly suitable for formulating radiation-curable colored coating compositions for forming protective and/or decorative coatings having a thickness greater than about 10 microns, and up to about 50 microns. While ink coatings on optical glass fibers usually have a thickness of about 3 to about 10 microns, the cure speed of the ink compositions according to the present invention have been described above using a thickness of 20 microns. Thus, at the thinner thicknesses usually used for forming an ink coating on an optical glass fiber, such as from about 3 to about 10 microns, the MEK rub value will be significantly greater than the MEK rub value measured at a 20 micron thickness. In general, as the thickness of the ink coating is increased, the cure speed decreases.

Thicker colored coatings tend to have a decreased concentration of pigment, based on the total weight of the colored coating, compared to ink coating. Because the colored coating is applied in at a thickness greater than ink coatings, a lower concentration of pigment is required to obtain the desired color.

The colored coating composition exhibits an enhanced cure speed and therefore is commercially feasible for use on high speed production lines, such as for appliances. The colored coating composition is also suitable for application to aircraft and automobile parts.

The invention will be further explained by way of the following examples, without being limited thereto.

EXAMPLE 1 AND COMPARATIVE EXAMPLES A THROUGH G

A radiation-curable base was first formed by combining the components shown in Table 1.

TABLE 1

| Component | Amount (% by weight of total composition) |
|---|---|
| Ethoxy Diacrylate Monomer | 42.85 |
| Aliphatic Urethane Diacrylate Oligomer | 25.25 |
| Pentaerythritol Tetra-acrylate | 12.55 |
| 1,6-Hexanediol Diacrylate | 1.68 |
| Isobornyl Acrylate | 3.88 |
| Phenoxy Ethyl Acrylate | 3.88 |
| Butylhydroxy Toluene | 0.52 |
| Benzophenone | 8.33 |
| 2-Methyl-1-(4-(Methylthio)phenyl)-2-(4-Morpholinyl)-1-Propanone | 1.04 |

The radiation-curable base was then combined with the photoinitiators shown in Table 2 to form radiation-curable carrier systems. The radiation-curable carrier systems were combined with the pigments shown in Table 3 to form radiation-curable ink compositions.

20 micron thick drawdowns of the ink compositions were formed on mylar films and then exposed to 0.125 J/cm$^2$ UV light to form sample films.

The MEK rub of the sample films were tested and the test results are shown in Table 3

The MEK rub test represents the degree of cross-linking that occurred in the sample. In general, the greater the number of rubs to disintegrate the sample, the greater the degree of cross-linking, and the faster the ink composition cured.

TABLE 2

| Component (weight % based on total weight of composition) | Examp. 1 | Comp. Examp. A | Comp. Examp. B | Comp. Examp. C | Comp. Examp. D | Comp. Examp. E | Comp. Examp. F | Comp. Examp. G |
|---|---|---|---|---|---|---|---|---|
| Radiation-Curable Base | 96 | 96 | 96 | 96 | 96 | 96 | 96 | 96 |
| Ink Cure Speed Enhancing Photoinitiator, CGI 819 (Ciba Geigy) | 4 | 0 | 0 | 0 | 0 | 0 | 0 | 0 |
| 2,4,6-Trimethylbenzoyldiphenyl-Phosphine Oxide and 2-Hydroxy-2-Methyl-1-Phenyl-1-Propanone | 0 | 4 | 0 | 0 | 0 | 0 | 0 | 0 |
| 2-Isopropyl Thioxanthone and 4-Isopropyl Thioxanthone | 0 | 0 | 4 | 0 | 0 | 0 | 0 | 0 |
| 75% and 25% of Bis(2,6-Dimethoxybenzyl)(2,4,4-Trimethylpentyl)Phosphine Oxide | 0 | 0 | 0 | 4 | 0 | 0 | 0 | 0 |
| 75% of 1-Hydroxycyclohexyl Phenyl Ketone and 25% of Bis(2,6-Dimethoxybenzyl)(2,4,4-Trimethylpentyl)Phosphine Oxide | 0 | 0 | 0 | 0 | 4 | 0 | 0 | 0 |
| 75% of 1-Hydroxycyclohexyl Phenyl Ketone and 25% of CGI 819 (Ciba Geigy) | 0 | 0 | 0 | 0 | 0 | 4 | 0 | 0 |
| 50% of (2,4,6-Trimethylbenzoyldiphenyl-Phosphine Oxide and 2-Hydroxy-2-Methyl-1-Phenyl-1-Propanone) and 50% of 2-Hyrodoxy-2-Methyl-1-Phenyl-1-Propanone | 0 | 0 | 0 | 0 | 0 | 0 | 4 | 0 |
| 50% of 1-Hydroxycyclohexyl Phenyl Ketone and 50% of | 0 | 0 | 0 | 0 | 0 | 0 | 0 | 4 |

TABLE 2-continued

| Component (weight % based on total weight of composition) | Examp. 1 | Comp. Examp. A | Comp. Examp. B | Comp. Examp. C | Comp. Examp. D | Comp. Examp. E | Comp. Examp. F | Comp. Examp. G |
|---|---|---|---|---|---|---|---|---|
| Bis(2,6-Dimethoxybenzyl)(2,4,4-Trimethylpentyl)Phosphine Oxide | | | | | | | | |
| Total of Radiation-Curable Carrier System | 100 | 100 | 100 | 100 | 100 | 100 | 100 | 100 |

TABLE 3

| Component (weight % based on total weight of composition) | Examp. 1 | Comp. Examp. A | Comp. Examp. B | Comp. Examp. C | Comp. Examp. D | Comp. Examp. E | Comp. Examp. F | Comp. Examp. G |
|---|---|---|---|---|---|---|---|---|
| Radiation-Curable Carrier System | 88 | 88 | 88 | 88 | 88 | 88 | 88 | 88 |
| Blue Pigment | 9 | 9 | 9 | 9 | 9 | 9 | 9 | 9 |
| White Pigment | 3 | 3 | 3 | 3 | 3 | 3 | 3 | 3 |
| Test Results | | | | | | | | |
| MEK (rubs) | 200 | 4 | 1 | 3 | 4 | 2 | 3 | 22 |

The results in Table 3 demonstrate that by incorporating the ink cure speed enhancing photoinitiator into the ink composition, surprisingly the ink composition can be suitably cured using a significantly lower dosage, on the order of about 0.125 J/cm² or less. As described above, the lower the dosage required to cure the ink composition, the faster the optical glass fiber drawing line speed. Thus, the ink composition according to the present invention offers significant commercial advantages over slower curing ink compositions.

Comparative Example E contained about 1 weight % of the ink cure speed enhancing photoinitiator used in Example 1. However, when 4 weight % of the ink cure speed enhancing photoinitiator was used in Example 1, the cure speed was surprisingly enhanced to an MEK value of greater than 200 rubs. The amount of the ink cure speed enhancing photoinitiator required to enhance the cure speed of the ink composition will depend on the type and amount of pigments present. Thus, while 1 weight % of the ink cure speed enhancing photoinitiator may have been insufficient for the pigments used in Comparative Example E, 1 weight % of the ink cure speed enhancing photoinitiator may provide an enhanced cure speed in ink compositions containing a different type and amount of pigment.

EXAMPLES 2 AND 3, AND COMPARATIVE EXAMPLE

Two radiation-curable carrier systems were first formed by combining the components shown in Tables 4 and 5.

TABLE 4

Carrier System A

| Component | Amount (% by weight of total system) |
|---|---|
| Epoxy Acrylate Monomer | 33.9 |
| Aliphatic Urethane Diacrylate Oligomer | 19.9 |
| Pentaerythritol Tetra-acrylate | 9.95 |
| Isobornyl Acrylate | 3.06 |
| Phenoxy Ethyl Acrylate | 3.06 |
| 1,6-Hexanediol Diacrylate | 13.64 |
| Silicone Diacrylate | 1.14 |
| 2,6-di-tert-Butyl-Methyl-Phenol | 0.57 |
| 2-Methyl-1-(4-(Methylthio)phenyl)-2-(4-Morpholinyl)-1-Propanone | 4.55 |
| CGI 819 (Ciba Geigy) | 1.14 |
| Acrylated Benzophenone | 9.09 |

TABLE 5

Carrier System B

| Component | Amount (% by weight of total system) |
|---|---|
| Epoxy Acrylate Monomer | 35.93 |
| Aliphatic Urethane Diacrylate Oligomer | 21.14 |
| Pentaerythritol Tetra-acrylate | 10.55 |
| Isobornyl Acrylate | 3.24 |
| Phenoxy Ethyl Acrylate | 3.24 |
| 1,6-Hexanediol Diacrylate | 11.52 |
| Silicone Diacrylate | 2.31 |
| 2,6-di-tert-Butyl-Methyl-Phenol | 0.58 |
| 50% Phosphine Oxide, Diphenyl (2,4,6-Trimethyl Benzoyl) and 50% 2-Hydroxy-2-Methyl-1-Phenyl-1-Propanone | 11.52 |

The radiation-curable carrier system A was combined with the pigments shown in Table 6 to form radiation-curable ink compositions. The radiation-curable carrier system B was combined with the pigments shown in Table 7 to form radiation-curable ink compositions. For comparison, commercially available radiation-curable inks (DSM Desotech) shown in Table 8 were utilized.

20 micron thick drawdowns of the ink compositions were formed on mylar films and then exposed to 0.125 J/cm² UV light to form sample films. The properties of the films was tested and the results are shown in Tables 6 through 8.

cure speed enhancing photoinitiator provided the ink coating with good adhesion to the outer primary coating in combination with providing good release from the matrix material. Thus, the ink coatings formed according to the present

TABLE 6

| Component (weight % based on total weight of composition) | White | Red | Violet | Yellow | Rose | Black | Slate | Orange | Blue | Green | Brown | Aqua |
|---|---|---|---|---|---|---|---|---|---|---|---|---|
| Radiation-Curable Carrier System (A) | 86.37 | 78.14 | 83.77 | 79.80 | 83.00 | 89.29 | 88.27 | 81.64 | 88.00 | 85.5 | 81.79 | 85.35 |
| Pigment | 13.63 | 21.86 | 16.23 | 20.20 | 17.00 | 10.71 | 11.73 | 18.36 | 12.00 | 14.50 | 18.21 | 1465 |
| Test Results |  |  |  |  |  |  |  |  |  |  |  |  |
| Viscosity (mPa.s) | 2410 | 1920 | 2150 | 2140 | 2260 | 2300 | 2440 | 2280 | 2420 | 2180 | 2300 | 2265 |
| MEK (rubs) | 200+ | 200+ | 200+ | 200+ | 200+ | 200+ | 170 200 | 200+ | 130 190 | 200+ | 200+ | 200+ |
| Release From Matrix Material | pass | pass | slight zipper | pass | pass | pass | pass | pass | pass | pass | pass | pass |
| Adhesion to Secondary Coating | good | good | good | good | good | good | good | good | good | good | good | good |
| RAU in Inert (%) | 75 | 74 | 77 | 83 | 84 | 83 | 81 | 83 | 80 | 81 | 79 | 79 |
| RAU in Air (%) | 73 | 67 | 73 | 79 | 78 | 79 | 77 | 78 | 75 | 77 | 75 | 75 |

Average RAU in Inert Atmosphere (%) was 80.
Average RAU in Air (%) was 76.

TABLE 7

| Component (weight % based on total weight of composition) | White | Red | Violet | Yellow | Rose | Black | Slate | Orange | Blue | Green | Brown | Aqua |
|---|---|---|---|---|---|---|---|---|---|---|---|---|
| Radiation-Curable Carrier System (B) | 85.01 | 75.96 | 82.14 | 77.78 | 81.39 | 88.22 | 87.10 | 79.81 | 86.80 | 84.05 | 79.97 | 83.14 |
| Pigment | 14.99 | 24.04 | 17.86 | 22.22 | 18.70 | 11.78 | 12.90 | 20.19 | 13.2 | 15.95 | 20.03 | 16.86 |
| Test Results |  |  |  |  |  |  |  |  |  |  |  |  |
| Viscosity (mPa.s) | 2420 | 1980 | 2120 | 2250 | 2260 | 2280 | 2474 | 2300 | 2370 | 2260 | 2200 | 2320 |
| MEK (rubs) | 200+ | 200+ | 200+ | 200+ | 200+ | 200+ | 200+ | 200+ | 200+ | 200+ | 200+ | 200+ |
| Release From Matrix Material | pass | pass | pass | pass | pass | pass | pass | pass | pass | pass | pass | pass |
| Adhesion to Secondary Coating | good | good | good | good | good | good | good | good | good | good | good | good |
| RAU in Inert (%) | 87 | 81 | 87 | 87 | 87 | 88 | 89 | 87 | 89 | 86 | 88 | 89 |
| RAU in Air (%) | 79 | 69 | 76 | 80 | 82 | 82 | 82 | 81 | 80 | 81 | 79 | 81 |

Average RAU in Inert Atmosphere (%) was 87.
Average RAU in Air (%) was 79.

TABLE 8

| Test Results | White | Red | Violet | Yellow | Rose | Black | Slate | Orange | Blue | Green | Brown | Aqua |
|---|---|---|---|---|---|---|---|---|---|---|---|---|
| MEK (rubs) | 200 | 200 | 155 | 108 | 200 | 180 | 155 | 145 | 133 | 200 | 185 | 135 |
| Release From Matrix Material | poor | poor | poor | poor | poor | poor | poor | poor | poor | poor | poor | poor |
| Adhesion to Secondary Coating | good | good | good | good | good | good | good | good | good | good | good | good |
| RAU in Inert (%) | 69 | 71 | 70 | 74 | 78 | 80 | 78 | 79 | 70 | 74 | 74 | 65 |
| RAU in Air (%) | 54 | 68 | 74 | 72 | 73 | 78 | 77 | 77 | 57 | 75 | 73 | 56 |

Average RAU in Inert Atmosphere (%) was 74.
Average RAU in Air (%) was 70.

By comparing the test results of Tables 6 and 7 with Table 8, it can be easily observed that the presence of the cure speed enhancing photoinitiator provided a dramatic increase in the average % RAU, when curing in air and in an inert atmosphere. It can also be observed that the presence of the invention are suitable for use in a ribbon assembly when break-out of the individual coated optical glass fibers is a desired property.

EXAMPLE 5

75 micron thick drawdowns of two commercially available radiation-curable outer primary coating compositions were cured on Mylar sheets by exposure to 1.0 J/cm$^2$ UV radiation to form outer primary films. Samples were made by cutting the cured films into 2 inch by 2 inch squares. The samples were then placed in a desiccator for a minimum of 15 minutes. The initial weight of each of the samples was measured. 3 samples were submerged into each of eight different monomers and weighed at intervals of 1 second, 5 seconds, 10 seconds and 30 seconds (total elapsed time). The percent weight change of each of the samples and the average weight change of the three samples for each monomer was calculated and the results are shown in Table 9.

ent levels of adsorption into different commercially available outer primary coatings. In general, the greater the adsorption into the outer primary coating, the greater the resulting adhesion between the cured ink coating and the outer primary coating.

Test Procedures

% RAU

This is an FTIR method for determining the degree of cure on the surface of a coating to a depth of 1 to 3 μm, following exposure to a predetermined dose of UV radiation. A drawdown of the sample material is first formed on a glass plate. The drawdown is then exposed to the predetermined dose of UV radiation to cure the drawdown and form a coating. The coating is cut into strips, approximately 10 mm by 50 mm.

TABLE 9

| Monomer | Commercial Outer Primary Coating No. 1 | | | | Commercial Outer Primary Coating No. 2 | | | |
|---|---|---|---|---|---|---|---|---|
| | Samp. 1 | Samp. 2 | Samp. 3 | Average | Samp. 1 | Samp. 2 | Samp. 3 | Average |
| | Percent Change In Weight After 30 Seconds | | | | Percent Change in Weight After 30 Seconds | | | |
| Hexanediol Diacrylate | +.58 | +.58 | +.39 | +.52 | +.52 | +.58 | +.39 | +.5 |
| Bisphenol A Ethoxylated Diacrylate | +.8 | +1.13 | +1.14 | +1.02 | +.46 | +.37 | +.33 | +.39 |
| Diacrylate Ester of Tricyclodecane Dimethanol | +1.03 | +.46 | +.64 | +.71 | +.98 | +.26 | +.75 | +.66 |
| Isobornyl Acrylate | +.25 | +.37 | +.26 | +.29 | +.43 | +.25 | +.11 | +.26 |
| Ethoxylated Nonylphenol Acrylate | +1.14 | +.87 | +.19 | +.73 | +.14 | +.48 | +.27 | +.3 |
| Phenoxyethyl Acrylate | +.8 | +.88 | +.93 | +.87 | +.85 | +.56 | +.37 | +.59 |
| n-Vinyl Formamide | +2.32 | +2.91 | +3.11 | +2.78 | +2.71 | +2.72 | +3.21 | +2.88 |
| Isodecyl Acrylate | +.23 | +.25 | +.30 | +.30 | +.14 | +.11 | +.33 | +.19 |
| | Percent Change in Weight After 10 Seconds | | | | Percent Change in Weight After 10 Seconds | | | |
| Hexanediol Diacrylate | +.55 | +.75 | +.22 | +.51 | +.72 | +.38 | +.55 | +.55 |
| Bisphenol A Ethoxylated Diacrylate | +1.24 | +.65 | +.58 | +.82 | +.33 | +.44 | +.3 | +.36 |
| Diacrylate Ester of Tricyclodecane Dimethanol | +.53 | +.46 | +.38 | +.46 | +.29 | +.33 | +.82 | +.48 |
| Isobornyl Acrylate | +.31 | +.35 | +.29 | +.32 | +.24 | +.03 | +.5 | +.26 |
| Ethoxylated Nonylphenol Acrylate | +.76 | +.53 | +.31 | +.53 | +.09 | +.42 | +.27 | +.26 |
| Phenoxyethyl Acrylate | +.74 | +.38 | +.55 | +.66 | +.75 | +.32 | +.42 | +.5 |
| n-Vinyl Formamide | +1.69 | +2.31 | +2.54 | +2.18 | +1.97 | +1.96 | +2.62 | +2.18 |
| Isodecyl Acrylate | +.26 | +.28 | +.30 | +.28 | +.14 | +.08 | +.18 | +.13 |
| | Percent Change in Weight After 5 Seconds | | | | Percent Change in Weight After 5 Seconds | | | |
| Hexanediol Diacrylate | +.78 | +.54 | +.27 | +.53 | +.8 | +.61 | +.71 | +.71 |
| Bisphenol A Ethoxylated Diacrylate | +.93 | +1.07 | +.74 | +.91 | +.26 | +.37 | +.33 | +.32 |
| Diacrylate Ester of Tricyclodecane Dimethanol | +.87 | +.46 | +.29 | +.54 | +.53 | +.51 | +.58 | +.54 |
| Isobornyl Acrylate | +.2 | +.32 | +.19 | +.24 | +.34 | +.34 | +.22 | +.3 |
| Ethoxylated Nonylphenol Acrylate | +1.83 | +.76 | +.31 | +.97 | +.26 | +.28 | +.27 | +.27 |
| Phenoxyethyl Acrylate | +.67 | +.41 | +.24 | +.44 | +.5 | +.6 | +.48 | +.53 |
| n-Vinyl Formamide | +1.13 | +1.92 | +1.69 | +1.58 | +1.44 | +1.34 | +2.02 | +1.6 |
| Isodecyl Acrylate | +.2 | +.14 | +.15 | +.16 | +.21 | +.14 | +.22 | +.19 |
| | Percent Change in Weight After 1 Second | | | | Percent Change in Weight After 1 Second | | | |
| Hexanediol Diacrylate | +.45 | +.4 | +.17 | +.34 | +.88 | +.46 | +.39 | +.58 |
| Bisphenol A Ethoxylated Diacrylate | +.65 | +1.1 | +1.07 | +.94 | +.26 | +.3 | +.33 | +.3 |
| Diacrylate Ester of Tricyclodecane Dimethanol | +.87 | +.62 | +.44 | +.64 | +.37 | +.29 | +.58 | +.41 |
| Isobornyl Acrylate | +.28 | +.4 | +.42 | +.37 | +.3 | +.28 | +.11 | +.23 |
| Ethoxylated Nonylphenol Acrylate | +1.03 | +.64 | +.31 | +.66 | +.26 | +.11 | +.17 | +.18 |
| Phenoxyethyl Acrylate | +.43 | +.24 | +.38 | +.35 | +.46 | +.35 | +.34 | +.38 |
| n-Vinyl Formamide | +.59 | +.73 | +.98 | +.77 | +.49 | +.59 | +1.05 | +.71 |
| Isodecyl Acrylate | +.2 | +.25 | +.11 | +.19 | +.14 | +.14 | +.15 | +.14 |

The test results in Table 9 demonstrate that the monomers present in radiation-curable ink compositions exhibit differ- An infrared spectrum of the uncured, liquid sample and an infrared spectrum of the cured sample are obtained. Infrared spectrometry is now well known and any infrared spectrometer can be utilized to obtain the infrared spectrum.

The net peak area of the acrylate unsaturation absorbance for the uncured liquid sample is measured. For most acrylate-based coatings, the absorbance at about 810 cm$^{-1}$ should be used. However, if the coating contains a siloxane or other component which absorbs strongly at or near 810 cm$^{-1}$, an alternative acrylate absorbance peak can be used. The absorbances at about 1410 cm$^{-1}$ and about 1635 cm$^{-1}$ have been found to be satisfactory. The net peak area can be measured using the well known baseline technique in which a baseline is drawn tangent to absorbance minima on either side of the peak. The area above the baseline and under the peak is the net peak area.

A reference area is then determined. The reference absorbance should not change in intensity as the liquid sample is cured. Many formulations have an absorbance in the range of about 780 to about 750 cm$^{-1}$ that can be used as a reference absorbance. The net peak area of the reference absorbance is measured.

The ratio of the acrylate absorbance to the reference absorbance for the uncured, liquid sample is determined using the following formula:

$$R_L = A_{AL}/A_{RL}$$

where $A_{AL}$ is the net peak area of the acrylate absorbance, $A_{RL}$ is the net peak area of the reference absorbance, and $R_L$ is the area ratio for the liquid sample.

The ratio of the acrylate absorbance to the reference absorbance for the cured sample is determined using the following formula:

$$R_C = A_{AC}/A_{RC}$$

where $A_{AC}$ is the net peak area of the acrylate absorbance, $A_{RC}$ is the net peak area of the reference absorbance, and $R_C$ is the area ratio for the cured sample.

The degree of cure as a percent reacted acrylate unsaturation (% RAU) is determined using the following formula:

$$\% \text{ RAU} = [(R_L - R_C) \times 100\%]/R_L$$

MEK Rub Test

The test procedures described in ASTM D 4752 was followed with the following exception. Light finger pressure was used on the material being rubbed against the test sample.

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A ribbon assembly having the functional capability of providing break-out of ink coated optical glass fibers from said ribbon assembly, said ribbon assembly comprising:
   a plurality of coated optical glass fibers;
   an ink coating on at least one of said coated optical glass fibers; and
   a matrix material directly bound to said ink coating and binding said plurality of coated optical fibers together, wherein said ink coating being formed from a radiation curable ink coating composition comprising:
      a radiation-curable carrier system containing a radiation-curable oligomer, a radiation curable monomer, and at least one photoinitiator; and
      a pigment dispersed in said radiation-curable carrier system, wherein said monomers, oligomers and photoinitiator are selected to provide an average percentage of reacted acrylate unsaturation which provides a level of adhesion between said matrix material and said ink coating that is less than a level of adhesion between said ink coating and said coated optical glass fiber to provide breakout of said ink coated optical glass fiber from said ribbon assembly when said ink coating composition is cured by exposure to an ultraviolet radiation dose of about 0.125 joules per square centimeter.

2. A ribbon assembly according to claim 1, wherein said ink coating having said degree of cure which provides an MEK value of at least 100 rubs when cured by exposure to an ultraviolet radiation dose of about 0.125 joule per square centimeter.

3. A ribbon assembly according to claim 1, wherein said ink coating having said degree of cure which provides an MEK value of at least 200 rubs when cured by exposure to an ultraviolet radiation dose of 0.125 joule per square centimeter.

4. An ribbon assembly according to claim 1, wherein said photoinitiator comprises at least one compound according to formula (1):

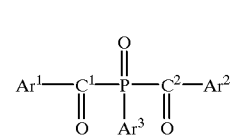

(1)

wherein: Ar represents a carbon containing compound having at least one aromatic functional group;
   P is bonded directly to an aromatic functional group present in Ar$^3$;
   C$^1$ is bonded directly to an aromatic functional group present in Ar$^1$; and
   C$^2$ is bonded directly to an aromatic functional group present in Ar$^2$, and wherein at least one of the carbon containing compounds Ar has a molecular weight and molecular structure that is capable of forming at least one of the following free-radicals upon exposure to ultraviolet radiation:

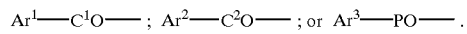

5. A ribbon assembly according to claim 4, wherein all three carbon containing compounds Ar have a molecular weight and molecular structure that is capable of forming said free-radicals.

6. A ribbon assembly according to claim 4, wherein the carbon containing compounds comprise from about 5 to about 15 carbon atoms.

7. A ribbon assembly according to claim 4, wherein sail carbon containing compounds comprise a furane group or a phenyl group.

8. A ribbon assembly according to claim 7, wherein at least one hydrogen on said furane group or said phenyl group is substituted with an alkyl or alkoxy group.

9. A ribbon assembly according to claim 1, wherein said photoinitiator comprises:

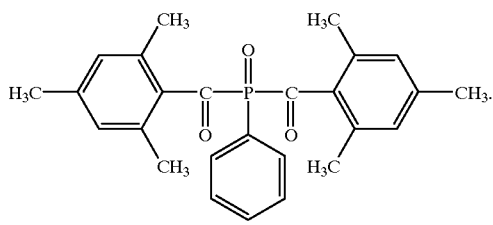

(2)

10. A ribbon assembly according to claim 1, wherein said ink coating having an average percentage of reacted acrylate unsaturation of at least 75% when said radiation-curable ink coating composition is cured by exposure to an ultraviolet radiation dose of about 0.125 joules per square centimeter in an inert atmosphere.

11. A ribbon assembly according to claim 10, wherein said ink coating having an average percentage of reacted acrylate unsaturation of at least about 85%.

12. A ribbon assembly according to claim 1, wherein said ink coating having an average percentage of reacted acrylate unsaturation of at least 70% when said radiation-curable ink coating composition is cured by exposure to an ultraviolet radiation dose of about 0.125 joules per square centimeter in air.

13. A ribbon assembly according to claim 12, wherein said ink coating having an average percentage of reacted acrylate unsaturation of at least about 75%.

14. A ribbon assembly according to claim 12, wherein said ink coating having an average percentage of reacted acrylate unsaturation of at least about 80%.

15. A ribbon assembly according to claim 1, wherein said average percentage of reacted acrylate unsaturation is based on a measured percentage of reacted acrylate unsaturation for at least 6 different colored ink compositions each formulated from the same radiation-curable carrier system and containing different colored pigments.

16. A ribbon assembly according to claim 1, wherein said average percentage of reacted acrylate unsaturation is based on a measured percentage of reacted acrylate unsaturation for at least 12 different colored ink compositions each formulated from the same radiation-curable carrier system and containing different colored pigments.

17. A ribbon assembly according to claim 1, wherein said monomer and oligomer comprise acrylate or methacrylate functional groups.

18. A ribbon assembly according to claim 1, wherein substantially all radiation-curable functional groups present in said monomer and oligomer are acrylate or methacrylate.

19. A ribbon assembly according to claim 1, comprising from about 55 to about 98 weight % of said carrier system, from about 1 to about 25 weight % of said photoinitiator, and from about 1 to about 20 weight % of said pigment, based on the total weight of said ink composition.

20. A ribbon assembly comprising:
a plurality of coated optical glass fibers; and
a matrix material which binds said plurality of coated optical glass fibers together, wherein at least one of said coated optical glass fibers comprises:
an optical glass fiber;
an inner primary coating adjacent to a surface of said optical glass fiber;
an outer primary coating adjacent to a surface of an inner primary coating; and
an ink coating adjacent to a surface of said outer primary coating, wherein said ink coating being formed from a radiation-curable ink coating composition containing a monomer selected to be adsorbable into said outer primary coating to a degree which when suitably cured provides a level of adhesion between said ink coating and said outer primary coating that is greater than a level of adhesion between said ink coating and said matrix material, and wherein said matrix material is directly bound to said ink coating.

21. A ribbon assembly according to claim 20, wherein said monomer exhibits an outer primary coating adsorption index of at least 7.

22. A ribbon assembly according to claim 20, wherein said monomer exhibits an outer primary coating adsorption index of at least 10.

23. A ribbon assembly according to claim 1, wherein said ink coating composition further comprises a least one release agent selected from the group consisting of silicones, silicone acrylates, fluorocarbon oils, and fluorocarbon resins.

* * * * *

UNITED STATES PATENT AND TRADEMARK OFFICE
CERTIFICATE OF CORRECTION

PATENT NO.   : 6,130,980
DATED        : October 10, 2000
INVENTOR(S)  : Murphy et al.

It is certified that error appears in the above-identified patent and that said Letters Patent is hereby corrected as shown below:

On the title page of patent, [75] Inventors, delete "Szurn" and replace with --Szum--.

Signed and Sealed this

Twelfth Day of June, 2001

*Attest:*

NICHOLAS P. GODICI
*Attesting Officer*        Acting Director of the United States Patent and Trademark Office

UNITED STATES PATENT AND TRADEMARK OFFICE
CERTIFICATE OF CORRECTION

PATENT NO. : 6,130,980  
DATED : October 10, 2000  
INVENTOR(S) : Murphy et al.

Page 1 of 1

It is certified that error appears in the above-identified patent and that said Letters Patent is hereby corrected as shown below:

On the title page of patent, [75] Inventors, delete "Szurn" and replace with --Szum--.

Signed and Sealed this

Second Day of October, 2001

Attest:

*Nicholas P. Godici*

NICHOLAS P. GODICI  
*Attesting Officer*     *Acting Director of the United States Patent and Trademark Office*